Patented July 11, 1933

1,917,351

UNITED STATES PATENT OFFICE

HARRY C. YOUNG, OF WOOSTER, OHIO

COLLOIDAL, HYDROPHILIC SULPHUR

No Drawing.   Application filed March 22, 1932.   Serial No. 600,570.

My invention refers to the composition of novel sulphur preparations characterized by hydrophilic colloidal properties, the presence of substantial amounts of polythionic acids, the absence of certain flocculating impurities in the sulphur preparations and the ability of said colloidal sulphur to be mixed with organic solvents and to withstand high temperatures and dilute alkalies without coagulating.

My invention further refers to the new processes of preparing my novel sulphur preparations.

My invention further comprises the application of my novel sulphur in the medical arts to combat pathogenic microorganisms which thrive on human and animal life.

Sulphur in various forms has been used for many centuries in the treatment of different diseases. It has been regarded as a partial specific for cure or control of certain skin diseases and internal troubles. Such sulphur as usually used in the treatment of skin diseases is applied in a suitable base to form a lotion, salve or soap. For internal treatment, the sulphur is commonly combined with molasses, agar-agar, oils, etc. and flavoring agents.

The sulphur used in such prior preparations is conveniently divided into three types:

1. The first group contains finely divided flowers of sulphur and a form obtained by grinding roll or stick sulphur to a dust or paste in a mortar. The flowers of sulphur and mechanically disintegrated products are composed of crystalline particles which, although approaching the size of colloidal particles, are not sufficiently peptized to form a stable colloidal dispersion in water or alcohol.

2. Precipitated sulphur, obtained by chemical precipitation from solutions of sulphur compounds, and milk of sulphur obtained by throwing sulphur out of alcoholic solution by dilution with water comprise the second type. Precipitated sulphur formed, for instance, by the action of an acid on a polysulphide is usually finely divided and, when suspended in water does not settle as rapidly as do the mechanically disintegrated products. Such precipitated sulphur is hydrophobic in nature and changes rapidly to a crystalline, insoluble form. Likewise, the milk of sulphur made from alcoholic solution is very finely particulate, hydrophobic and changes rapidly to the crystalline form.

The crystalline, hydrophobic types of sulphur are the ones at present usually incorporated into lotions, salves, soaps and laxatives. The efficiency of such sulphur for therapeutical and pharmaceutical uses is very low, when compared to other disinfectants.

3. Colloidal sulphur preparations contaminated with flocculating impurities have also been prepared for therapeutical uses, for instance as follows:

One method consists in slowly passing hydrogen sulphide gas into a cold, concentrated solution of sulphur dioxide. The small amount of precipitated sulphur which is formed at first is centrifuged off. The sulphur which remains in suspension in the liquor is then flocculated with sodium chloride, filtered and taken up with water. The sulphur was found to contain traces, 0.14 millimol, per gram, of polythionic acids and to contain large amounts of adsorbed sodium chloride (1.25 millimol per gram). When treated with salts having an alkaline reaction this type of colloidal sulphur is coagulated and is not reversible. When heated to about 70° C. such sulphur preparations are quickly coagulated and when heated to 100° C. the transformation to insoluble sulphur is practically instantaneous.

Another old method of preparing colloidal sulphur consists in quickly mixing a solution of sodium thiosulphate with sulphuric acid. The suspension is then cooled and the sulphur is flocculated with sodium chloride. The flocculated sulphur is then filtered off and taken up with water. Here again the sulphur contains large amounts of adsorbed sodium chloride and sulphate (about 6 grams of NaCl per 100 grs. of sulphur).

Polythionic acids, together with colloidal sulphur, are formed in both of the above mentioned reactions. The polythionic acids are soluble in water and largely remain in the aqueous medium when the sulphur is flocculated. Therefore, when the flocculated sulphur is filtered off to secure it in a concentrated form, as described above, the polythionic acids in the aqueous medium pass through the filter and are lost.

The removal of the flocculating salts which are adsorbed by the sulphur and go down with it cannot be satisfactorily done by dialysis. The trace of polythionic acids which is contained in the product as well as the flocculating salts pass through the dialysing membrane. The sulphur is thereby freed of its peptizing agent and so loses most of its colloidal properties. It is apparent from these observations that it is impossible by the methods described under 3 to prepare a concentrated pure hydrophilic colloidal sulphur with high content of polythionic acids.

The types of colloidal sulphur as described above when in a 1% aqueous dispersion have a pH about 2.3 to 2.6. They are very unstable at elevated temperatures (100° C.) and settle out at ordinary temperatures in a short time. They are sensitized by alkaline agents and are easily coagulated with small amounts of sodium carbonate. They cannot be satisfactorily suspended in a concentrated form in alcohol. With an increase in concentration of sulphur the viscosity increases faster than the rate calculated by an arithmetic progression. This rapid increase in viscosity has been attributed to agglomeration and coalescence of the sulphur particles.

As noted before, when hydrogen sulphide is introduced into sulphurous acid a small amount of colloidal sulphur, together with some precipitated sulphur, and a small amount of polythionic acids are formed.

The novel process according to my invention starts at this point. Instead of flocculating and filtering off the sulphur to procure it in a concentrated form as has been done, I have found that more of the gases in substantial equivalent amounts can be introduced if the aqueous medium is free from fixed inorganic salts. The amount of precipitated sulphur does not increase, but on the other hand it is peptized and goes into colloidal suspension, or solution. At the same time the amount of polythionic acids formed increases gradually over concentrations of about 1.5 millimols per gram of sulphur where their peptizing effect becomes of practical value, until a concentration of more than 2.5 millimols of these acids per gram of colloidal sulphur is reached. At this point a true hydrophilic colloidal system rich in sulphur and polythionic acids is formed. When further amounts of the gases are introduced, further absolute amounts of polythionic acids are formed together with more colloidal sulphur. However, there is no outstanding further change in the colloidal properties of the sulphur. The reaction mass gradually thickens and forms a thick paste when a concentration of about 50% sulphur is reached. I have continued the reaction until a paste containing 70% of sulphur was obtained. A small amount of acid liquor which in this case raises to the top is then poured off.

While not essential to the production of colloidal sulphur with hydrophilic properties by the above process, I prefer to react hydrogen sulphide with sulphur dioxide in such a manner that a slight excess of sulphur dioxide is maintained in the reaction mixture.

By my novel process, in which flocculating agents are not used, a concentrated form of hydrophilic sulphur, highly peptized with polythionic acids and free from flocculating salts is formed.

This novel sulphur preparation takes on the form of a thick viscous paste. It has a strong acid reaction due largely, as indicated above, to a substantial amount of polythionic acids. One gram of the sulphur in the 70% preparation has associated with it about 2.3 millimol of the acids. A 1% suspension of this sulphur preparation in distilled water has a pH of about 1.3. The suspension is yellow in color, opalescent and transparent. The sulphur particles are amicronic in size. With an increase in the concentration of the sulphur the viscosity of the suspension increases according to an arithmetic progression. This indicates that the size of the particles is substantially the same in dilute and concentrated suspensions. There is, therefore, no noticeable coagulation or agglomeration on concentration as in the case of the other colloidal sulphur as described under type 3.

One of the characteristic properties of my novel concentrated hydrophilic colloidal sulphur is its association with substantial amounts of polythionic acids. These and the absence of inorganic flocculating salts are its main chemical differences from colloidal sulphur preparations heretofore produced. Its physical characteristics are believed to be due to a large extent to these chemical characteristics.

By my novel process I am enabled to produce a concentrated colloidal sulphur which has more than 1.5 millimol of polythionic acids associated with one gram of the sulphur. It has been found that this is about the least amount of polythionic acids which can sufficiently peptize a colloidal sulphur and make it stable to a reduction of acidity, to heat, concentration, inorganic salts and organic solvents. It is its ability to remain in colloidal suspension in the presence of these agents and under said conditions that distinguishes my novel sulphur preparations from other types of sulphur.

A suspension of this hydrophilic colloidal sulphur in water, owing to the substantial amounts of polythionic acids present and the absence of inorganic salts which sensitize colloids, can withstand the flocculating effects of large amounts of inorganic salts. I can, for instance, add 10 grams sodium chloride to a liter of a 0.5% suspension of my sulphur without causing flocculation. This amount had been found sufficient to flocculate the other types of colloidal sulphur. Because of the highly peptized properties, a suspension of my novel sulphur can be altered to a pH 3.0 with sodium carbonate without the sulphur being coagulated. Such a suspension, owing to its tolerance of heat can be sterilized in an autoclave for 15 min. at 20 lb. pressure.

Quantitative analysis of a sample of my novel concentrated sulphur paste showed for instance the following results: 0.06% sulphurous, 0.15% sulphuric, 30.5% pentathionic (with traces of other polythionic) acids and about 69% sulphur.

The total sulphur compounds was determined by oxidation with nitric acid and bromine to sulphate which was weighed as barium sulphate. The various acids were determined as follows: sulphurous and thiosulphuric by iodine titration, sulphuric as barium sulphate and the total by alkali titration. The amounts of the polythionic acids were determined according to methods published by Kurlenacker and Bittner in Zeitsch. f. anorg. Chemie., 1925, vol. 142, pages 119–129. These methods comprise double decomposition with mercuric chloride, action of a sulphite on the acids and breaking down of the acids with potassium cyanide. The amount of free sulphur was obtained by deducting the amount of sulphur found in the various acids from the total sulphur.

The stability of my novel colloidal sulphur preparations and their content of substantial amounts of polythionic acids contribute enormously to their usefulness for therapeutical purposes.

When sulphur is applied to the human skin, some of it is slowly transformed into hydrogen sulphide. This compound is known to reduce polythionic acids to sulphur and water. Thus in the case of sulphurs with small amounts of polythionic acids, the acids are destroyed and the sulphur soon crystallizes and becomes relatively inactive. The amounts of polythionic acids present in my novel preparations are so large that even three days after application to the skin enough of these acids is left to maintain the sulphur in its colloidal form and toxic condition.

One of the most important manipulations which my sulphur will stand without losing its colloidal properties, is that it can be freely suspended in alcohol. A suspension containing 65% sulphur preparation and 35% alcohol has been prepared and found to be very stable. My concentrated preparations also mix readily with glycerine, fatty substances, vegetable oils, inert materials to form smooth salves and lotions. This novel sulphur can be incorporated in agar-agar gels and other protective colloids and held evenly distributed in this semi-solid form. Such preparations as shown above have been kept for many months without an important change in their physical properties. The addition of traces of gelatine, gum arabic etc. and iodine further stabilizes my preparations.

The various forms of sulphur listed above under types 1, 2 and 3 have been used with varying degrees of success in the treatment of skin diseases. Sulphur is considered to be a specific cure for scabies, or itch. However, it is not generally considered to be sufficiently toxic to control ringworm and athlete's foot.

In the treatment of scabies with sulphur the sulphur is usually mixed with Lanoline vaseline or similar bases. These sticky, greasy and bulky mixtures are usually applied to the infested part (in the case of scabies, sometimes to the greater part of the body), thoroughly rubbed in, and left on for several days. To prevent the loss of the sulphur the patient is usually dressed or wrapped in suitable cloths, often longlegged and sleeved underwear and required to remain quiet during the time of the treatment. It has been applied in the same manner to parts diseased with athlete's foot, ringworm, etc. The results in these cases have usually been unsatisfactory.

The use of my novel sulphur preparations involves a different, quite simplified technique. I mix for instance about 30 grams of my concentrated sulphur paste with about 70 grams alcohol. Then with a soft swab I apply the alcoholic sulphur preparation to the infected part. Only enough is applied to effect a complete covering of the infected part. The preparation soon becomes relatively dry owing to the evaporation of the alcohol. There is left on the skin a practically continuous film of colloidal sulphur. This sulphur film, when relatively dry, cannot be removed by excessive rubbing or even by several washings with soap and water. It will generally remain in this condition for three days, at which time the sulphur film will break and loosen in small flakes. Any time during the treatment, if it is desired or deemed necessary, the sulphur may be removed with 10% aqua ammonia.

Some of the skin diseases which have been controlled with alcoholic suspensions of my hydrophilic colloidal sulphur are as follows:

Dermatomycosis trichophtina, a disease commonly called athlete's foot.

Diseases, commonly called ringworm, caused by fungi related to the one causing the athlete's foot.

Scabies, or seven years itch, caused by scabia Ascaris.

In most of the cases complete relief has been secured by one application as described above of my novel sulphur. In some cases which had withstood all known remedies, two or three applications were sufficient to effect complete cure.

The advantages of my alcoholic hydrophilic sulphur treatment can be conveniently stated in two groups:

1. Control of disease for which other treatments have not been adequate and control of diseases with fewer treatments.

2. The treatment is simple and can be administered by laymen. Patient may continue with ordinary activities. Patient is not inconvenienced by bandages or special clothes. Sulphur adheres to skin and will not soil clothes.

My treatment is safely used on patients who are able to tolerate other sulphur treatments. In several cases irritation has been relieved immediately whereas other treatments when applied formerly, aggravated the condition. Numerous applications of my sulphur to normal skin have not resulted in a single case of noticeable irritation.

I claim:

1. As a new composition of matter, colloidal hydrophilic sulphur containing at least 1.5 millimol of polythionic acids per gram of sulphur, said sulphur being readily dispersible in water and alcohol, stable in a colloidal suspension when heated to 100° C., and not readily coagulated by weak alkalies.

2. As a new composition of matter an aqueous suspension of colloidal hydrophilic sulphur containing at least 50% sulphur.

3. As a new composition of matter an aqueous suspension of colloidal hydrophilic sulphur containing at least 1.5 millimol of polythionic acids per gram of sulphur and consisting of at least 50% sulphur.

4. As a new composition of matter an aqueous suspension of colloidal hydrophilic sulphur, free from inorganic salts, containing at least 1.5 millimol of polythionic acids per gram of sulphur and consisting of at least 50% sulphur.

5. As a new composition of matter an aqueous suspension of colloidal, hydrophilic sulphur containing at least 1.5 millimol of polythionic acids per gram of sulphur and consisting of at least 70% of sulphur.

In testimony whereof, I affix my signature.

HARRY C. YOUNG.